Patented Jan. 2, 1940

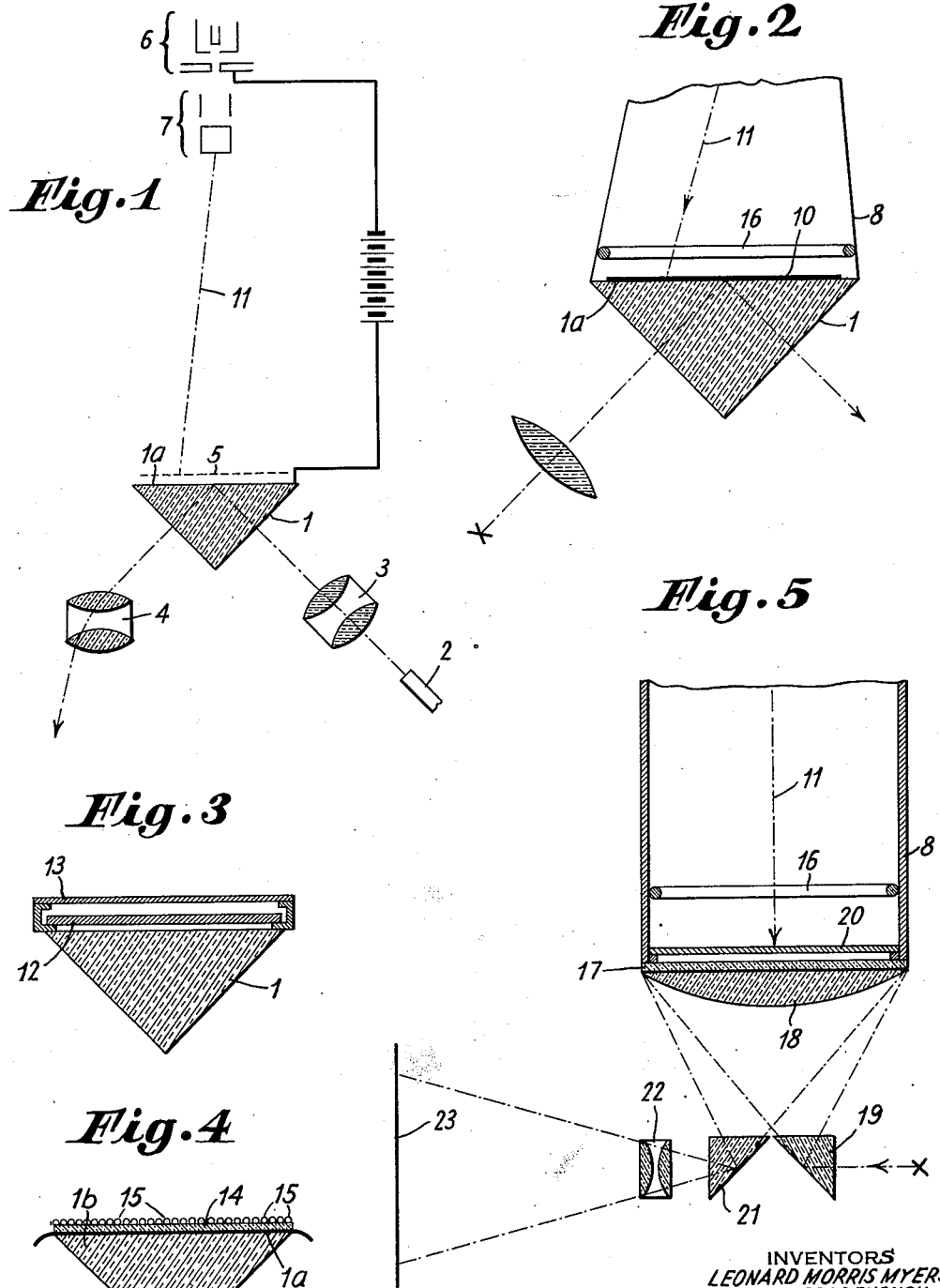

2,185,379

UNITED STATES PATENT OFFICE 2,185,379

ELECTRICALLY CONTROLLED LIGHT VALVE APPARATUS

Leonard Morris Myers, Yorkshire, and Ernest Frederick Goodenough, Essex, England, assignors to Radio Corporation of America, a corporation of Delaware Application November 18, 1936, Serial No. 111,342
In Great Britain November 20, 1935

6 Claims. (Cl. 178—7.7)

This invention relates to electrically controlled light valves, by which expression is meant devices whereby the passage of light may be controlled electrically. More specifically the invention relates to electrically controlled light valves whereby the passage of light at different elemental areas in the cross section of a beam of light may be electrically controlled.

The primary application of the invention is to television and like reproducing apparatus, an important object of the invention being to provide an improved arrangement whereby a large television picture, e. g., for projection purposes, may be obtained.

According to one feature of this invention an electrically controlled light valve comprises in combination a large plurality of minute bodies in combination with an optically prepared surface of another body and means for controlling the electrostatic state of charge of the minute bodies relative to said other body so as to alter in a desired manner the optical characteristics of the combination by virtue of minute movements of the minute bodies resulting from variation in the state of charge thereof.

According to another feature of this invention an electrically controlled light valve comprises a plurality of minute asymmetrical crystals in association with an optical surface and in providing means for electrostatically orienting the crystals at different parts of said surface so as to cause the light dispersing action of said crystals to be varied in dependence upon the applied electrical forces.

As regards the first feature of this invention, it is well known that if two bodies have their surfaces brought into close juxtaposition, there is an attractive force between them. For example, if two pieces of glass having optically planar surfaces be placed with those surfaces together a substantial force is required to pull them apart. Similarly two pieces of polished mica when placed together will at once form optical contact even in air, while a similar phenomenon is exhibited with liquids—for example there is adhesion between a mercury surface and a copper plate which has not been wetted.

Though the theory underlying the above mentioned facts is rather obscure and by no means well understood the generally accepted explanation is that the molecules disposed within a substance are subject to electrostatic forces of surrounding molecules these electrostatic forces within the substances being so balanced that the molecules take up a particular disposition characteristic of the substance in question. These exerted within a substance are represented in the term "cohesion". At the surface of a substance, however, the forces exerted on the molecules are not in balance, there being an unbalanced force such that attraction will occur between the surface of the substance and that of another body close thereto. This attraction is generally termed "adhesion".

Since, in accordance with the above theory the adhesion between two bodies is due to electric attraction, it should be possible to neutralize such attraction and thereby reduce or cancel out adhesion by suitably charging electrically one of the bodies. Experiment shows that adhesion can be reduced or cancelled out in this way.

As regards the method of operation of the second feature of this invention this can best be visualized by imagining light from a suitable source to be projected into and collimated by a lens behind which is a silvered or similar mirror surface which reflects said light back through the lens to another point. Suppose the mirror surface to be spaced a short distance from the back of the lens, i. e., from the planar face thereof, which is remote from the light source, if now a layer of asymmetrical crystals, such as mica, be placed upon the polished planar back face of the lens, the light will be dispersed before reaching the mirror surface, and accordingly will not be reflected to and collected at the second point. If, however, the crystals at any elemental area on the back of the lens were suitably oriented by means of an electrostatic field, the light would not be dispersed at that elemental area but would be reflected to and collected at the second point.

Since the second feature of this invention involves the raising or orienting of light (as opposed to heavy) crystals instead of producing considerable forces between co-planar surfaces (as is involved in carrying out the first feature of this invention) the electrostatic forces required will be generally considerably less than those required in carrying out the first feature of this invention. There is, however, the difficulty that as soon as the electrostatic force becomes sufficient to lift a crystal element, the whole element will rise and adhere to the charged electrode by which the force is applied. This means that the light will be fully modulated when a limiting value of force is reached so that half tones will not be reproduced. This defect, may, however, be avoided by fixing one end of each crystal element so that electrostatic force applied thereto bends it in such manner that the projected plane thereof presented to oncoming light becomes less as the said force increases.

The invention is illustrated in the accompanying drawing:

Figure 1 schematically shows one form of electrically controlled light valve.

Figure 2 shows one application of my invention.

Figure 3 shows a particular form of prism arrangement.

Figure 4 shows another form of prism arrangement; and

Figure 5 shows an arrangement in conjunction with the cathode ray tube.

Referring to Figure 1 which shows purely schematically one form of electrically controlled light valve in accordance with this invention, a totally reflecting prism 1 is utilized and light from a source 2 is projected via a suitable lens system 3 and said prism to a viewing screen (not shown) the light travelling from the source 2 into the prisms 1 so as to be totally reflected from the totally reflecting surface 1a thereof through a further lens system 4 to the screen. The totally reflecting face 1a of the prism 1 is optically polished and upon this face are scattered extremely small particles (not shown) such as mica crystals of a thickness not amounting to more than about 100 molecules. These particles are represented in Figure 1 by the broken line 5. Such crystals can be prepared chemically as known per se. Owing to adhesion effect, optical contact will normally take place between the crystals and the prism face, and with such optical contact existing the prism will cease to act as a totally reflecting prism by reason of the absorption effect of the particles. If, however, at any particular point on the face of the prism the small particles be so charged electrically as to cancel out or reduce the adhesion force so that optical contact ceases to exist, the prism will be totally reflecting at that point. For the purposes of obtaining television pictures it is proposed in accordance with this feature of the invention to scan by means of a cathode ray beam 11 which is modulated by television signals (either as respects the speed of scanning or as respects the intensity of the beam or in both respects) the mica or other particles upon the totally reflecting face of the prism so that the reflecting qualities of the prism at the individual elements of its operating face will be varied in accordance with the television signals. In Figure 1 the scanning cathode ray source is schematically represented by an electron gun system 6 and associated mutually perpendicular pairs 7 of deflector plates.

In the embodiment represented in Figure 2 there is a cathode ray tube 8 (shown broken away) provided with an end wall 9 which is optically polished and to which is attached the totally reflecting face 1a of a totally reflecting prism 1. Light from a suitable source 2 is projected as a beam through the prism to the operating face 1a thereof whence it is re-directed to a projection screen or the like (not shown). On the inside of the flat end plate of the tube are distributed extremely fine carbon particles (for example) in much the same way as a fluorescent screen is formed on the end of the now well known cathode ray reproducer tube. These particles are not shown. Above the screen constituted by the fine carbon particles—i. e., on the side of the said screen towards the electron gun of the tube—is disposed a sheet 10 of mica which is provided with a layer of electrically conductive particles e. g. the mica may be sputtered with metal so that the individual metal particles are insulated from one another or the mica sheet may be painted or silvered over to form a coating and this coating ruled through so as to provide individual elements in accordance with the definition required in the television pictures. The carbon layer on the surface of the end wall of the tube is positively charged so that by induction the surface of the conducting layer on the mica sheet will present a positive potential to the oncoming electron beam. The electron beam 11 is modulated in any manner known per se by television signals and is caused to scan the effective picture area at the end of the tube. The potential of the conductive layer on the mica sheet 10 is arranged to be higher than that of the anode of the electron gun so that electrons from the gun will reach and charge the discrete elements on the mica sheet. When these elements are charged they tend to pull the carbon particles away from the end wall of the tube by electrostatic forces which will depend upon the density of the charges.

As scanning takes place, therefore, the carbon particles can be caused to rise and break the optical contact with the end wall of the tube since where such optical contact is broken, light will be totally reflected but will not be totally reflected anywhere else, television picture reproduction may be effected.

In another arrangement illustrated purely schematically in Figure 3 a similar cathode ray tube (the body of which is not shown) with a totally reflecting prism 1 at its end is employed but in place of the carbon particles and associated ruled or sputtered mica sheet there is positioned on the gun side of the end plate of the tube a very thin mica sheet 12, e. g., a sheet of thickness of about 100 molecules (the diameter of one molecule being $10^{-7}$ cm.) the sheet of mica being painted on one side with colloidal graphite and being positioned so that the unpainted surface of the mica lies on the glass end wall of the tube normally making optical contact therewith. On the gun side of this thin sheet of mica is a second sheet of mica rigidly fixed, e. g., as shown parallel thereto, this second sheet being sputtered or silvered and ruled so as to have a surface made up of a number of conductive picture elements insulated from one another. Scanning is effected as before, and it will be seen that with this arrangement the charges received by the discrete elements on the second mica sheet 13 will tend locally to raise the lower very thin sheet 12 on the glass end wall of the tube, so that as scanning occurs an effect similar to that obtained with the first embodiment is secured.

In the embodiments of Figures 2 and 3 optical contact normally exists and electrical forces are applied during scanning to break or modify this conduct at different elemental areas. The inverse arrangement is however possible, i. e., it is possible so to arrange matters that contact normally does not exist but is caused to occur locally as a result of electrostatic forces applied during scanning. In one embodiment of this nature represented in Figure 4 the totally reflecting surface 1a of a glass prism 1 is silvered over (as represented at 1b) to the thickness of a fraction of a wave length and another glass or other transparent sheet 14 (e. g., of mica) of extremely small thickness is placed over the silvering. Upon the second sheet of transparent material are placed loosely a number of carbon particles represented as dots 15 and such as can be obtained by evaporating a colloidal solution, these particles each containing a larger number of molecules than is the case with the particles in the embodiments of Figures 2 and 3. In other words, these particles are small enough to be discrete but are large enough under normal conditions not to make optical contact with the transparent surface beneath them. A layer of such particles can easily be deposited by painting the surface with a colloidal solution of carbon in water and evaporating the water. If a suitable and sufficient electric charge be given to one of these particles it may be caused to make contact with the adjacent surface. Calculation indicates that the amount of charge required to do this is rather more than is at present conveniently practical. For this reason the embodiment of Figure 4 is not at present recommended although it is possible embodiment and may be preferred where a very powerful scanning cathode ray beam is available.

The embodiments so far described involve the bestowal of charges upon discrete particles or elemental areas on a ruled or sputtered screen and a subordinate feature of the invention is concerned with providing an improvement permitting the charging to be varied at will within given limits.

In accordance with this improvement a conductive collector ring is provided in proximity to the ruled or sputtered surface and means—preferably adjustable—are provided for setting up a moderate electrostatic field between the collector ring and the said surface. Such a collector ring is represented at 16 in Figure 2. The conductive material upon the said surface is chosen as a material of low work function, e. g., caesium. If the collector ring is positively charged with respect to the anode of the electron gun of the tube, secondary emission from the elemental areas of the ruled or sputtered surface will take place and will be collected by the collector ring and since, by virtue of the choice of the material (caesium) the secondary emission transcends the primary acceptance, the electron beam will charge the elemental areas positively since those areas will lose negative electrons by secondary emission. If, on the other hand, the collector ring is charged strongly negatively with respect to the anode of the gun of the tube, although the elements on the ruled or sputtered screen will accept negative electrons and secondary emission will occur, secondary electrons emitted from said elements will fall back since they will not be attracted to the collector ring. Accordingly, it is possible by varying the potential of the collector ring with respect to the anode of the electron gun of the tube to cause the elements of the ruled or sputtered screen to be charged either positively or negatively and a useful control or adjustment is thereby provided. Any charge acquired by an element will leak to an adjacent element so that the tendency will be for all the elements to acquire the same potential and if an electrical connection is made to the sputtered or ruled screen surface the tendency will be for all the elements in that surface to acquire a potential determined by the electrical connection. For a screen surface which is constituted by a layer of silver ruled into picture elements, it has been found that the resistance between elements is generally of the order of $10^{14}$ ohms. This is sufficient to leak away a potential of 300 volts in about $\frac{1}{25}$ of a second. Hence by reason of this leakage it is possible to limit the charge received and therefore the voltage required by any particular element by adjusting the potential of the collector ring.

In the embodiment shown in Figure 5 there is employed a cathode ray tube 8 having an end wall constituted by a polished planar optically flat plate 17 of glass. Cemented to the outer face of this flat plate of glass is a convex lens 18. Light from a source is projected in any convenient manner, e. g., by means including a totally reflecting prism 19 to the lens the said lens being arranged to collimate the incident divergent light so that the light pasing through the lens will be parallel. Inside the tube and parallel to the flat end wall thereof is a sheet 20 of mica which is spaced a short distance from the said end wall e. g. at a distance of about 1 mm. The upper face of the mica, i. e., the face which is nearer the electron gun of the tube is formed with a layer of conductive elements which are insulated from one another, e. g., it may be sputtered with metal or be silvered over and then ruled to provide a number of elements in accordance with the required picture definition. The evacuated space between the mica sheet 20 and the end wall of the tube is filled in with asymmetrical crystals (not shown). There are very many different forms of crystals which might be used, but mica crystals are very convenient. In general the crystals will be about four times as long as they are wide and their length will not exceed about 0.1 of a millimeter. When the crystals are in a state of repose and thus in a state of equilibrium, their flat surfaces will rest on the glass end wall of the tube and will accordingly substantially prevent light from reaching the silvered surface of the mica plate. In other words, the incident light will be dispersed. A cathode ray beam 11 modulated in any manner known per se in accordance with television signals is caused to scan the picture elements on the mica sheet and accordingly to bestow charges upon these elements, the charges depending upon the picture signals. These charges on the individual elements will bring about orientation of the asymmetrical crystals disposed in their immediate vicinity. Preferably the crystals are fixed each at one end so that half tone effects can be obtained (as already described). Consider the case of one elemental picture area on the mica screen which is charged sufficiently to change the orientation of the adjacent crystals through a right angle. At the area where the said orientation has occurred light will pass through the layer of crystals to the silvered surface and will be reflected therefrom back through the lens. Such light is collected for example, by a suitably positioned totally reflecting prism 21 and projected by a suitable projection lens system 22 on to a viewing screen 23. At any point in the area of the end of the tube the light passed through the lens will depend upon the orthometric projections of the individual crystal faces on the plane of the end plate, the projection area of any crystal being, of course, greatest when the crystal is in stable equilibrium (flat side down) and least when the crystal is electrostatically oriented through a right angle. Accordingly as the cathode ray beam modulated in accordance with picture signals passes through its scanning path the crystals are oriented in accordance with the said signals, and in this manner television picture reproduction is obtained. It will be noted that if the crystals are fixed at one end the light valve action obtained will be not merely an "on and off" action but a fully controlled action so that half tone effects are obtained.

In practice a conducting layer is introduced between the lens and the end plate of the tube. This conducting layer, which may be constituted by a suitable layer of silver on the flat face of the lens, is very thin—preferably only a fraction of a wave-length thick—and therefore absorbs very little light. Its purpose is to enable the establishment of an electrostatic field between itself and the sputtered or ruled surface of the mica sheet.

If the very thin conductive layer between the lens and the end wall of the tube is raised to a higher potential than that of the anode of the electron gun of the cathode ray tube, positive charges will be induced on the said surface and on the elements of the mica plate. Therefore, when the said surface is positively charged with respect to the electron gun anode, electrons will be received from the gun and will not be re-emitted, and this, of course, involves that the elements on the mica plate will be capable of acquiring negative charges. Alternatively, the material constituting the picture elements on the mica plate may be of low work function, e. g., caesium, in which case a suitably disposed collector ring 16 may be provided to collect secondary emission, and since this secondary emission will transcend the primary acceptance the elements will receive positive charges.

However the elements are charged the leakage between them will be sufficient to leak away the charges rapidly enough to ensure that in the time interval between successive passages of the scanning electron beam over any particular elemental area, the said area will have leaked away its charge and be prepared to receive a further charge.

If desired, means may be provided for adjusting the potential of the collector ring and thereby limiting and controlling the charging action. If the ring be negatively charged then, notwithstanding that a material of low work function, such as caesium, be used for the picture elemental areas on the mica sheet, the charging of such elements will be negative since secondary electrons emitted therefrom will not be attracted to the collector ring but will fall back again.

What we claim is:

1. An electrically controlled light valve comprising a totally reflecting prism whose totally reflecting face is optically polished, a plurality of small crystals positioned in optical contact with the totally reflecting face of said prism, and means for scanning the totally reflecting surface with an electron beam whereby the electrostatic state of charge of the minute crystals relative to the optical surface and to each other is changed in accordance with said beam, said electrostatic forces being adapted to move said crystals and vary the optical characteristics of the totally reflecting surface.

2. A light valve apparatus comprising a totally reflecting prism having an optically polished totally reflecting face, a cathode ray tube having the end wall thereof attached to said totally reflecting face of said prism, a plurality of extremely fine carbon particles distributed on the inner face of the end wall of said cathode ray tube, a transparent insulating sheet mounted within said tube and parallel to the totally reflecting surface of the prism, conductive particles mutually insulated from each other mounted on the side of said sheet remote from the tube end wall, means for developing and deflecting a cathode ray beam so as to scan the said transparent insulating sheet, and a source of light of substantially constant intensity directed onto the totally reflecting surface of the prism through one of the faces thereof.

3. A light valve system comprising a totally reflecting prism having an optically polished totally reflecting face, said face being silvered with a coating having a thickness of a fraction of a wave length of visible light, a transparent insulating sheet of small thickness positioned parallel to said totally reflecting face and in contact with said silvering, a layer of carbon particles of colloidal dimensions positioned on the face of said transparent sheet remote from the optically polished surface, means for for scanning said carbon particles with a cathode ray beam so as to alter the optical characteristics of the totally reflecting face of the prism in accordance with the intensity of the beam and a source of light of substantially constant intensity directed onto the optically polished face of said prism through one of the faces thereof.

4. A light valve system comprising a cathode ray tube having a polished planar optically flat end wall, a transparent sheet of insulating material positioned inside of said tube and spaced a short distance from said end wall, a layer of mutually insulated conductive particles positioned on said transparent insulating sheet on the side thereof remote from said end wall, a layer of asymmetrical crystals positioned between said transparent insulating sheet and said polished end wall, means for scanning the side of said transparent insulating sheet remote from said end wall by a modulated cathode ray beam, and a source of light of substantially constant intensity directed onto said end wall to be reflected therefrom.

5. An electrically controlled light valve comprising a large plurality of minute bodies in combination with the reflecting surface of a totally reflecting prism whose totally reflecting face is optically polished, said minute bodies comprising extremely small mica crystals, means for controlling the electrostatic state of charge of the minute bodies relative to said prism comprising a television or picture signal modulated scanning cathode ray beam whereby the optical intensity characteristics of the combined reflecting surface and minute bodies are altered in a desired manner as a result of the variation in the state of charge of said minute bodies.

6. A light valve apparatus comprising a cathode ray tube having an envelope, a totally reflecting prism having the reflecting surface thereof attached to the end wall of said tube, a sheet of mica having one side thereof painted with colloidal graphite, said sheet of mica being positioned in such tube so as to have the unpainted surface thereof normally in contact with the end wall of the tube, the second sheet of mica having a layer of mutually insulated conductive particles positioned one side thereof, said second sheet of mica being positioned adjacent the sheet of mica having one side thereof painted, and on the side thereof remote from the end wall of the cathode ray tube, means for scanning said second sheet of mica with a modulated cathode ray beam, and a source of light of substantially constant intensity directed onto the totally reflecting surface of said prism through one of the faces thereof.

LEONARD MORRIS MYERS.
ERNEST FREDERICK GOODENOUGH.